(12) United States Patent
Rylander

(10) Patent No.: US 8,387,715 B2
(45) Date of Patent: Mar. 5, 2013

(54) BUSHING FOR MOUNTING A LATERALLY ADJUSTABLE PIVOT ARM

(75) Inventor: David J. Rylander, Victoria, IL (US)

(73) Assignee: Deere & Company, Moline, IL (US)

(*) Notice: Subject to any disclaimer, the term of this patent is extended or adjusted under 35 U.S.C. 154(b) by 385 days.

(21) Appl. No.: 12/651,754

(22) Filed: Jan. 4, 2010

(65) Prior Publication Data

US 2011/0162565 A1 Jul. 7, 2011

(51) Int. Cl.
*A01B 15/00* (2006.01)
*A01B 23/00* (2006.01)
*A01B 31/00* (2006.01)
*A01B 35/20* (2006.01)
*A01C 13/00* (2006.01)

(52) U.S. Cl. ........ 172/736; 172/740; 172/748; 172/763; 111/193; 111/137; 111/135; 111/69; 111/163; 111/165

(58) Field of Classification Search .......... 172/536, 172/681, 684, 684.5, 734, 736, 739, 740, 172/748, 762, 604; 111/193, 137, 135, 134, 111/69, 163, 168, 164, 165
See application file for complete search history.

(56) References Cited

U.S. PATENT DOCUMENTS

| 5,427,038 A | 6/1995 | Ege |
| 5,904,107 A | 5/1999 | Kester |
| 6,321,667 B1 | 11/2001 | Shoup |
| 6,378,622 B1 | 4/2002 | Kostrun |
| 2007/0074879 A1 | 4/2007 | Frasier |

OTHER PUBLICATIONS

European Search Report received Apr. 21, 2011 (7 pages).

*Primary Examiner* — Christopher J. Novosad

(57) ABSTRACT

A bushing is provided for mounting a pivot arm that has both a threaded portion as well as one or two smooth cylindrical portions. The threaded portion enables the pivot arm to be a laterally adjusted by rotating the bushing while the smooth portion or portions provide a bearing surface or surfaces for the pivot arm loads. This removes the load from the threads, reducing wear of both the bushing and the pivot arm, thereby reducing maintenance cost.

2 Claims, 3 Drawing Sheets

US 8,387,715 B2

BUSHING FOR MOUNTING A LATERALLY ADJUSTABLE PIVOT ARM

FIELD OF THE INVENTION

The present invention relates to a bushing for mounting a laterally adjustable pivot arm and in particular to such a bushing having a threaded portion for laterally adjusting the pivot arm and allowing the arm to pivot and a smooth cylindrical portion bearing the load on the pivot arm.

BACKGROUND

A typical structure for an agricultural planter row unit includes a frame to which a furrow opener is mounted. A depth control member, such as a gauge wheel, is positioned adjacent the furrow opener to limit the depth to which the opener penetrates into the soil. The gauge wheel is mounted to an arm that is pivotally mounted to the frame. The gauge wheel and pivot arm are laterally adjustable relative to the frame so that the gauge wheel can be placed close to, or in light contact with the opener disks. This enables the gauge wheel to prevent moist soil from sticking to the opener. To provide for a lateral adjustment of the gauge wheel, the pivot arm is attached to the frame through a bushing assembly having a threaded a bushing and a through bore that receives a mounting bolt threaded into the frame. The threads on the bushing engage the threads in the pivot arm. By rotating the bushing, the pivot arm is moved laterally toward or away from the opener disk. This structure applies the load on the gauge wheel to the threads of the bushing and the pivot arm.

SUMMARY

A bushing is provided for mounting the pivot arm that has both a threaded portion as well as one or two smooth cylindrical portions. The threaded portion enables the pivot arm to be a laterally adjusted while the smooth portion or portions provide a bearing surface or surfaces for the pivot arm loads. This removes the load from the threads, reducing wear of both the bushing and the pivot arm, thereby reducing maintenance cost.

DESCRIPTION OF THE PREFERRED EMBODIMENT

Figure 1:
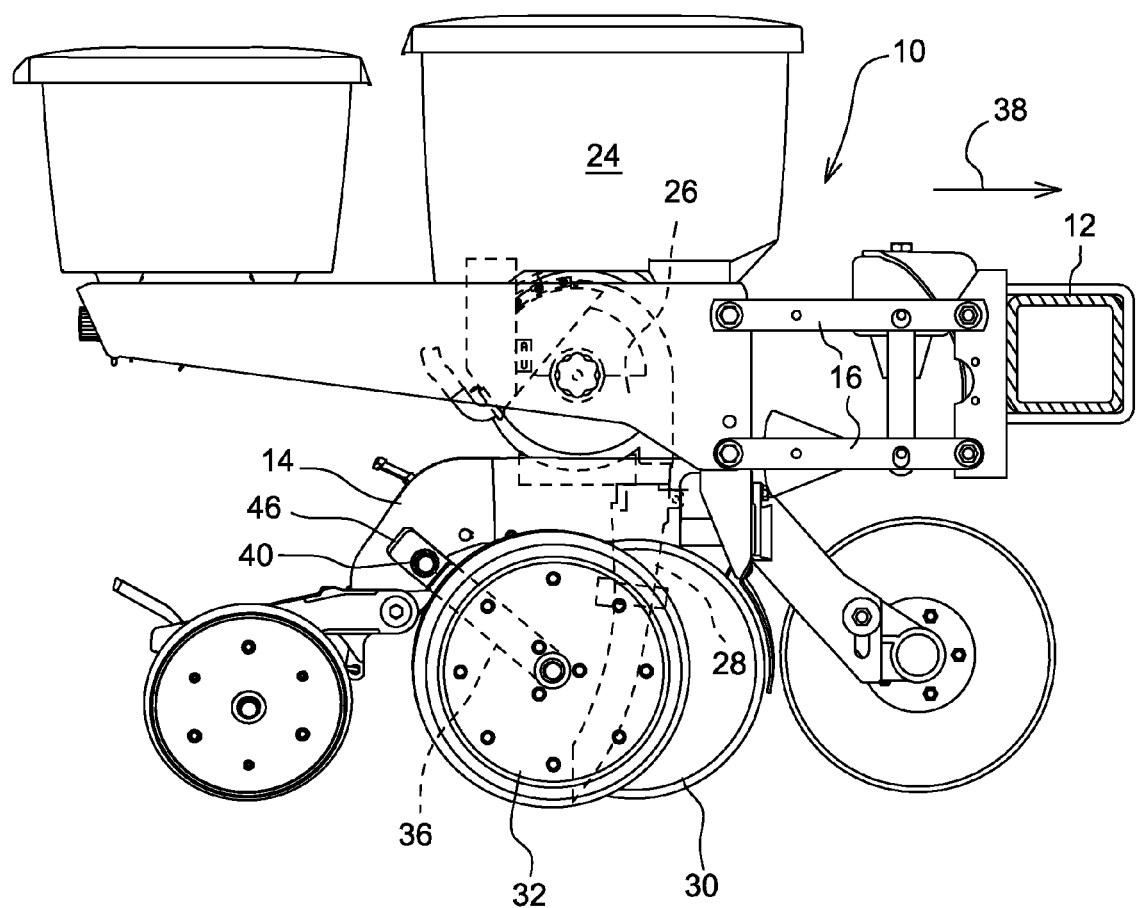
FIG. 1 is a side view of a planter row unit having the bushing described below.

With reference to FIG. 1, a planter row unit 10 is shown mounted to transversely extending tool bar 12 in a conventional manner. The row unit 10 is provided with a central frame member 14 coupled to the tool bar by a parallelogram linkage 16 to enable vertical relative movement between the row unit and the toolbar in a known manner. Seed is stored in seed hopper 24 and provided to a seed meter 26. The seed meter singulates seed from a seed pool and drops the individual seeds through a seed tube 28 into a planting furrow. The furrow is formed in the soil by a double disk furrow opener having a pair of closely spaced disks 30. Gauge wheels 32 control the depth of the furrow and are mounted to the frame member 14 by pivot arms 36. There is one gauge wheel adjacent the outer side of each opener disk. One disk and gauge wheel are shown in FIG. 1. The arm 36 pivots about a bushing assembly at the end of the arm mounted to the frame member 14. A gauge wheel depth adjustment mechanism, not show, acts on the arm 36 to limit upward rotation of the arm, thereby setting the relative position of the gauge wheel and opener disk. The arm pivots for two reasons, one reason is to adjust the amount of penetration of the opener disk. The other reason is to allow the gauge wheel to move upward during operation when the wheel encounters rocks or other obstacles. The gauge wheel must also be adjustable laterally. The gauge wheel must be close to or even lightly touching the opener disk. This allows the gauge wheel to remove moist soil that tends to adhere to the disk and prevents the disk from pulling soil upward from the side wall of the seed furrow. Lateral adjustability is needed to compensate for wear of the gauge wheel over time and to allow for variability in the size and shape of the resilient gauge wheel material.

Figure 2:
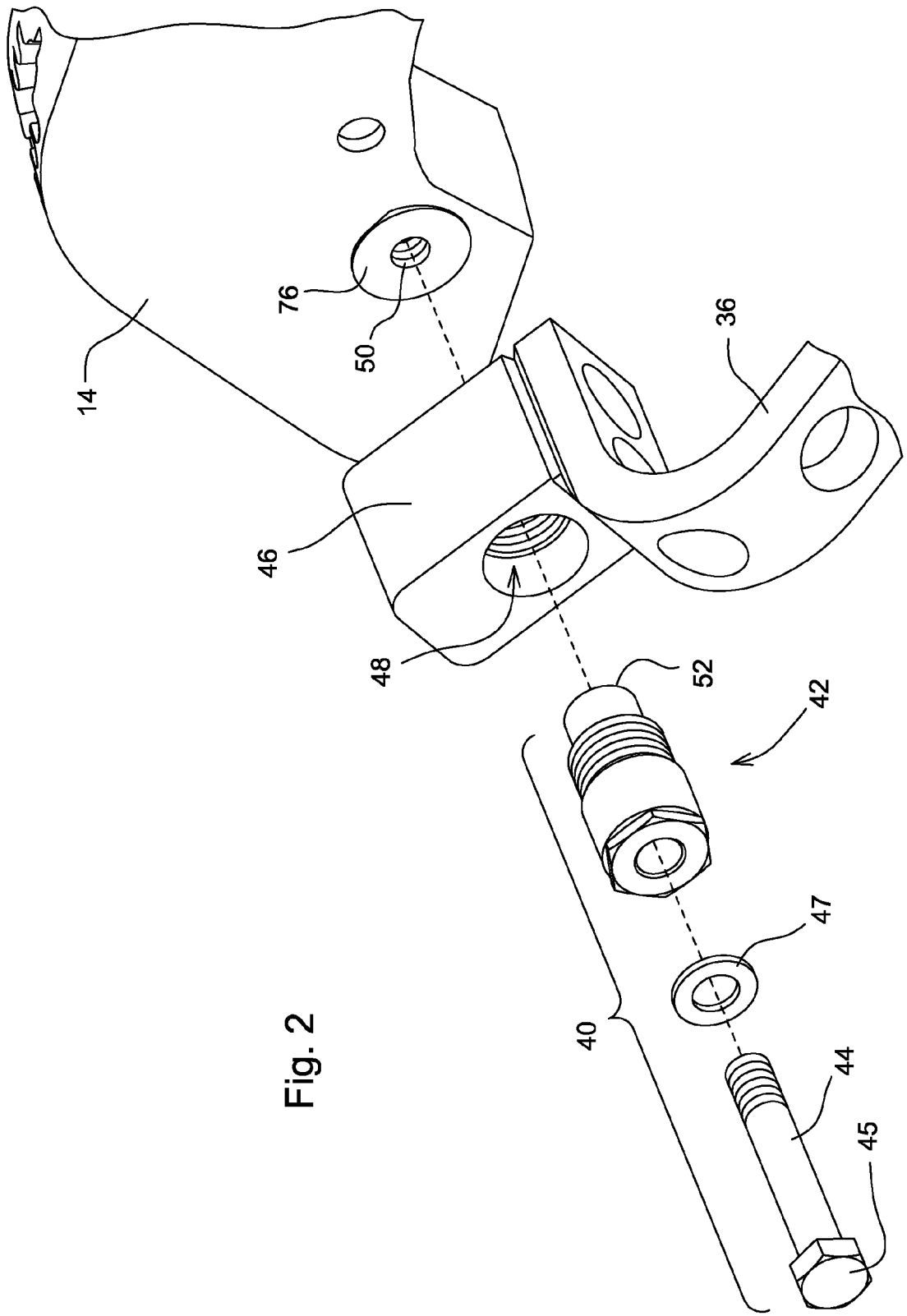
FIG. 2 is an exploded perspective view of the bushing and pivot arm.
Figure 3:
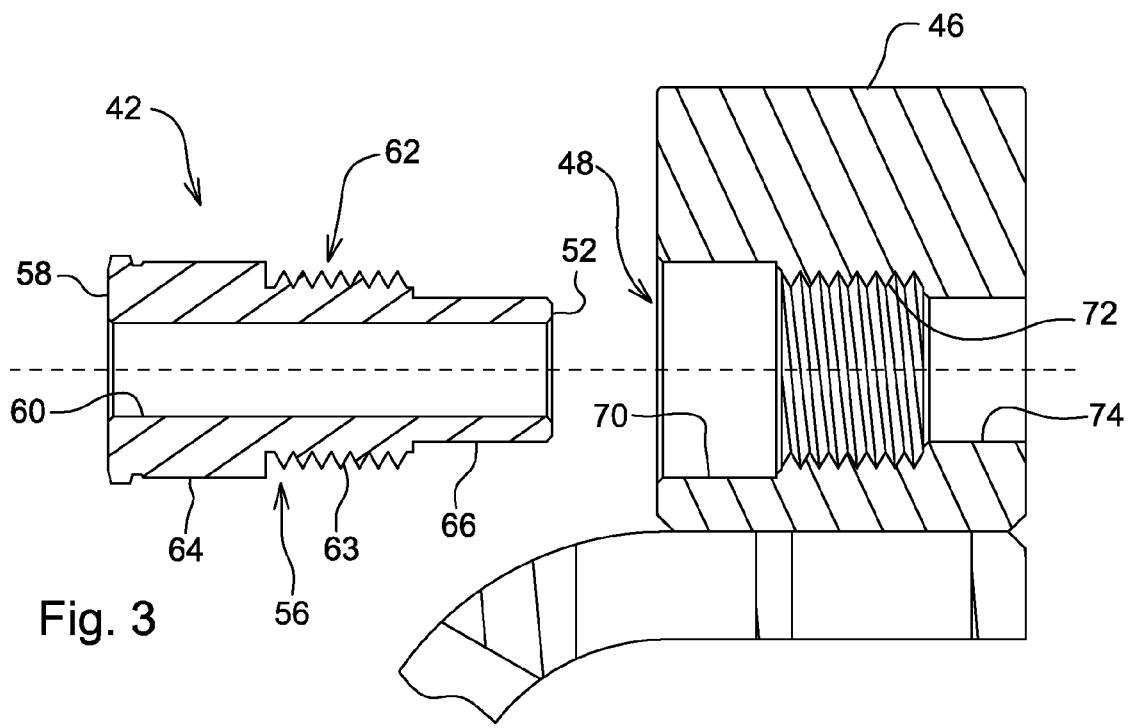
FIG. 3 is a sectional view of the bushing and pivot arm.

The bushing assembly 40 includes a bushing 42 and through bolt 44 as shown in FIGS. 2 and 3. The pivot arm 36 has a busing block 46 at the end of the arm where the arm is mounted to the central frame member 14. The arm 36 and bushing block may be integrally formed as one piece or may be a multiple piece assembly. The bushing 42 extends through a bore 48 in the block 46. The through bolt 44 has a head 45 and is threaded into the hole 50 in the central frame member 14. When the bolt 44 is tightened, the bushing distal end 52 bears against the frame member 14 and the bushing is prevented from rotating. With the bolt 44 slightly loosened but still in the hole 50, the bushing 42 can be rotated to laterally adjust the pivot arm 36 and gauge wheel 32.

The bushing 42 has a cylindrical body 56 with a head 58 at a proximal end. The head 58 is hex shaped to enable a tool to be used to rotate the bushing. Shapes other than a hex can be used as desired. A through bore 60 extends through the bushing 42 for the bolt 44 with the bolt head 45 adjacent the bushing head 58. A washer 47 maybe provided between the bolt head and the bushing head. The cylindrical body 56 is formed with a threaded center portion 62 having threads 63 and two smooth portions 64 and 66. Smooth portion 64 is located between the head 58 and the threaded portion 62 while the smooth portion 66 is located between the threaded portion 62 and the distal end 52 of the bushing 42. The diameter of the smooth portion 64 is larger than the outside diameter of the threads 63. The diameter of the smooth portion 66 is smaller than the root diameter of the threads 62.

The bore 48 in the bushing block 46 is complementarily shaped to receive the bushing 42. The bore 48 has a larger diameter smooth portion 70, a threaded portion 72 and a smaller diameter smooth portion 74. When assembled, the smooth portions of the bushing and the smooth portions of the bushing block 46 form bearing surfaces to support the loads on the gauge wheel. By "smooth" it is meant the surfaces are free of threads and have a surface finish suitable for the loads on the gauge wheel and the amount of rotation desired. The bushing maybe lubricated by grease in a conventional manner. Lateral adjustment of the gauge wheel position is accomplished by rotating the bushing, causing the bushing block to move axially along the threads 63 of the bushing. Once the gauge wheel is in the desired position, the bolt 44 is tightened, securing the bushing in place against the face 76 of the central frame member 14. This prevents rotation of the bushing, keeping the gauge wheel arm in position axially along the length of the bushing. The pivot arm 36 remains free to rotate about the bushing as the gauge wheel moves up and down during normal operation.

Figure 4:
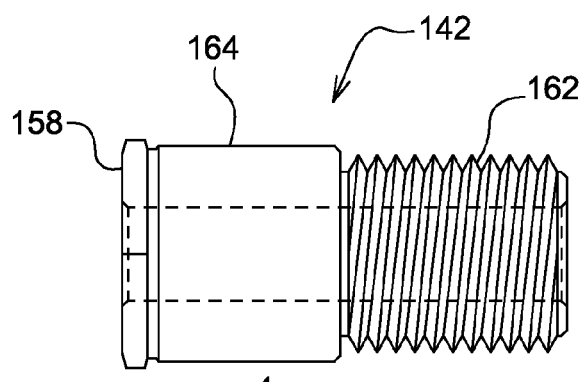
FIGS. 4 and 5 are side views of alternative embodiments of the bushing.
Figure 5:
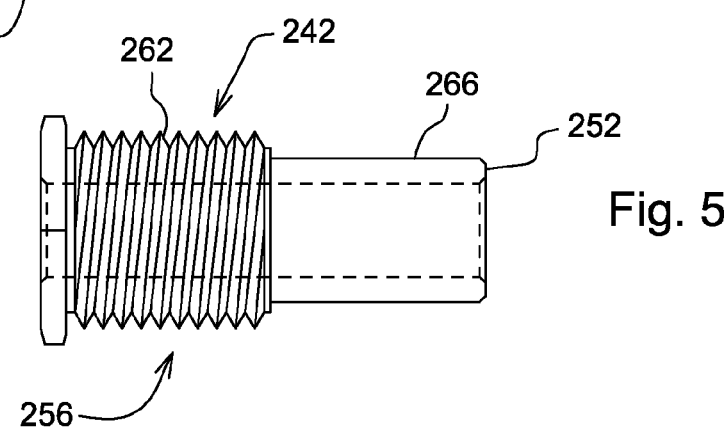

Alternative embodiments of the bushing are shown in FIGS. 4 and 5. In FIG. 4, a bushing 142 is shown in which the cylindrical body 152 has a single smooth portion 164 and a threaded portion 162. In this embodiment, the smooth portion is between the head 158 and the threaded portion 162. In FIG. 5, a bushing 242 is shown in which the cylindrical body 256 has a threaded portion 262 and a smooth portion 266. In this embodiment, the smooth portion 266 is between the threaded portion 262 in the distal end 252. The bushings 142 and 242 provide the benefit of having a cylindrical bearing surface but do not provide the benefits of the bushing 42 of two, spaced apart, bearing surfaces to better carry lateral load on the gauge wheel. The bushing block will be shaped complementary to the bushing. In all embodiments, the loads are no longer carried by the threads of the bushing and bushing block, eliminating a source of wear on the threads.

Having described the preferred embodiment, it will become apparent that various modifications can be made without departing from the scope of the invention as defined in the accompanying claims.

The invention claimed is:

1. A row unit for an implement comprising:
a frame with a threaded hole therein;
a depth control member;
a pivot arm having one end coupled to the depth control member and a bushing block at the other end for pivotally mounting the pivot arm to the frame, the bushing block having a bore therethrough, a portion of the bore being threaded and at least one portion of the bore being smooth;
a bushing having a cylindrical body with a head at one end and a through bore, the cylindrical body further having a cylindrical surface with threads on a portion thereof for engagement with the threads in the bore of the bushing block and at least one portion of the cylindrical surface being smooth for engagement with the smooth portion of the bore in the mounting block; and
a mounting bolt having a head at one end, the bolt extending through the bore in the bushing with the bolt head adjacent to the head of the bushing and extending beyond a distal end of the bushing opposite the bushing head for insertion into the threaded hole in the frame to mount the bushing to the frame and prevent rotation of the bushing about the mounting bolt, with the bushing block and pivot arm being rotatably supported on the bushing.

2. The row unit as defined by claim 1 wherein the bore in the bushing block has first and second smooth portions on opposite sides of the threaded portion and the bushing has first and second smooth portions on opposite sides of the threaded portion for engagement with the first and second smooth portions of the bore in the mounting block.

* * * * *